(12) United States Patent
Tarui et al.

(10) Patent No.: US 11,073,820 B2
(45) Date of Patent: Jul. 27, 2021

(54) MACHINING SUPPORT DEVICE, NUMERICAL CONTROLLER, AND MACHINING SUPPORT SYSTEM

(71) Applicant: FANUC CORPORATION, Yamanashi (JP)

(72) Inventors: Yoshihiko Tarui, Yamanashi (JP); Yoshinori Hoshino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/837,474

(22) Filed: Apr. 1, 2020

(65) Prior Publication Data

US 2020/0341455 A1 Oct. 29, 2020

(30) Foreign Application Priority Data

Apr. 26, 2019 (JP) .............................. JP2019-086473

(51) Int. Cl.
  *G05B 19/4155* (2006.01)
  *G05B 19/4093* (2006.01)
  *G05B 19/19* (2006.01)

(52) U.S. Cl.
  CPC ......... *G05B 19/4155* (2013.01); *G05B 19/19* (2013.01); *G05B 19/40937* (2013.01)

(58) Field of Classification Search
  None
  See application file for complete search history.

(56) References Cited

U.S. PATENT DOCUMENTS

| 2018/0067471 A1* | 3/2018 | Saitou ................ G05B 19/4065 |
| 2018/0250784 A1* | 9/2018 | Kasahara ........... B23Q 17/0909 |
| 2018/0259935 A1* | 9/2018 | Saitou .................. G05B 19/182 |
| 2020/0130107 A1* | 4/2020 | Mochizuki ............. B23K 26/38 |

FOREIGN PATENT DOCUMENTS

JP 2018151736 A 9/2018

\* cited by examiner

*Primary Examiner* — Ryan A Jarrett
(74) *Attorney, Agent, or Firm* — Studebaker & Brackett PC

(57) ABSTRACT

A machining support device for supporting improvement of a machining result of a numerical controller includes: a machining resource information acquisition unit that acquires functions set in advance in the numerical controller as machining resource information; a machining content information acquisition unit that acquires a machining content to be executed by the numerical controller as machining content information; a machining result calculation unit that calculates an expected machining result expected to be obtained when the machining content included in the machining content information is performed on the basis of the machining resource information; a retrieving unit that retrieves software that improves the calculated expected machining result; and an informing unit that informs of the retrieved software.

8 Claims, 12 Drawing Sheets

MACHINING SUPPORT DEVICE, NUMERICAL CONTROLLER, AND MACHINING SUPPORT SYSTEM

This application is based on and claims the benefit of priority from Japanese Patent Application No. 2019-086473, filed on 26 Apr. 2019, the content of which is incorporated herein by reference.

BACKGROUND OF THE INVENTION

Field of the Invention

The present invention relates to a machining support device, a numerical controller, and a machining support system.

Related Art

Conventionally, a machine tool (an example of an industrial machine) in which a numerical controller (CNC: computerized numerical control) for performing a machining process is known. An operation of the machine tool is controlled by a numerical controller. The machine tool can manufacture various products by performing machining.

In machining using a machine tool, the conditions (good surface quality (surface roughness), dimension accuracy, short machining time, and the like) required for products are various. Therefore, machining conditions such as parameters are set in the machine tool according to the conditions required for products. On the other hand, since setting of machining conditions such as parameters requires specialty, the setting greatly depends on the experience of a setup manufacturer and the users. For example, when parameters of a machine tool are set, specialty is sometimes required because it is difficult to know the influence of each parameter on machining conditions. Therefore, it is difficult for a user who is not skilled in machining to set machining conditions optimal for a machine tool. Therefore, a numerical controller and a CAD/CAM-CNC integration system capable of selecting functions appropriate to the requirements of machining and optimizing parameters are proposed (for example, see Patent Document 1).

Patent Document 1: Japanese Unexamined Patent Application, Publication No. 2018-151736

SUMMARY OF THE INVENTION

In the system disclosed in Patent Document 1, selection of functions to be used for machining and setting optimal parameters are performed automatically on the basis of machining resources which are functions set in advance in a numerical controller and a machine tool, a machining content to be performed, and required machining conditions. In this way, the system disclosed in Patent Document 1 can provide machining results more appropriate to a user's desire. It may be more preferable if a user can check which software can be set in order to make a system more user-friendly.

(1) An aspect of the present disclosure relates to a machining support device for supporting improvement of a machining result of a numerical controller, including: a machining resource information acquisition unit that acquires functions set in advance in the numerical controller as machining resource information; a machining content information acquisition unit that acquires a machining content to be executed by the numerical controller as machining content information; a machining result calculation unit that calculates an expected machining result expected to be obtained when the machining content included in the machining content information is performed on the basis of the machining resource information; a retrieving unit that retrieves software that improves the calculated expected machining result; and an informing unit that informs of the retrieved software.

(2) Another aspect of the present disclosure relates to a machining support system including: a plurality of numerical controllers; and the machining support device according to (1), wherein the machining support device informs the other numerical controllers of the software retrieved by one of the numerical controllers.

According to an aspect, it is possible to provide a machining support device, a numerical controller, and a machining support system capable of allowing a user to check which software can be set.

DETAILED DESCRIPTION OF THE INVENTION

Hereinafter, a machining support device 30, a numerical controller 20, and a machining support system 1 according to embodiments of the present disclosure will be described with reference to FIGS. 1 to 12.

The machining support device 30, the numerical controller 20, and the machining support system 1 according to the embodiments are apparatuses for performing machining of a work set in CAD/CAM, for example. The machining support device 30, the numerical controller 20, and the machining support system 1 determine parameters for operating a machine tool on the basis of a machining program of the set work, the functions (machining resources) set in advance in the numerical controller 20, and required conditions (good surface quality (roughness), dimension accuracy, short machining time, and the like). The machining support device 30, the numerical controller 20, and the machining support system 1 are apparatuses capable of presenting (informing) a function that can satisfy the required conditions to a user with respect to the determined parameters when there is the function that can satisfy the required conditions.

First Embodiment

Figure 1:
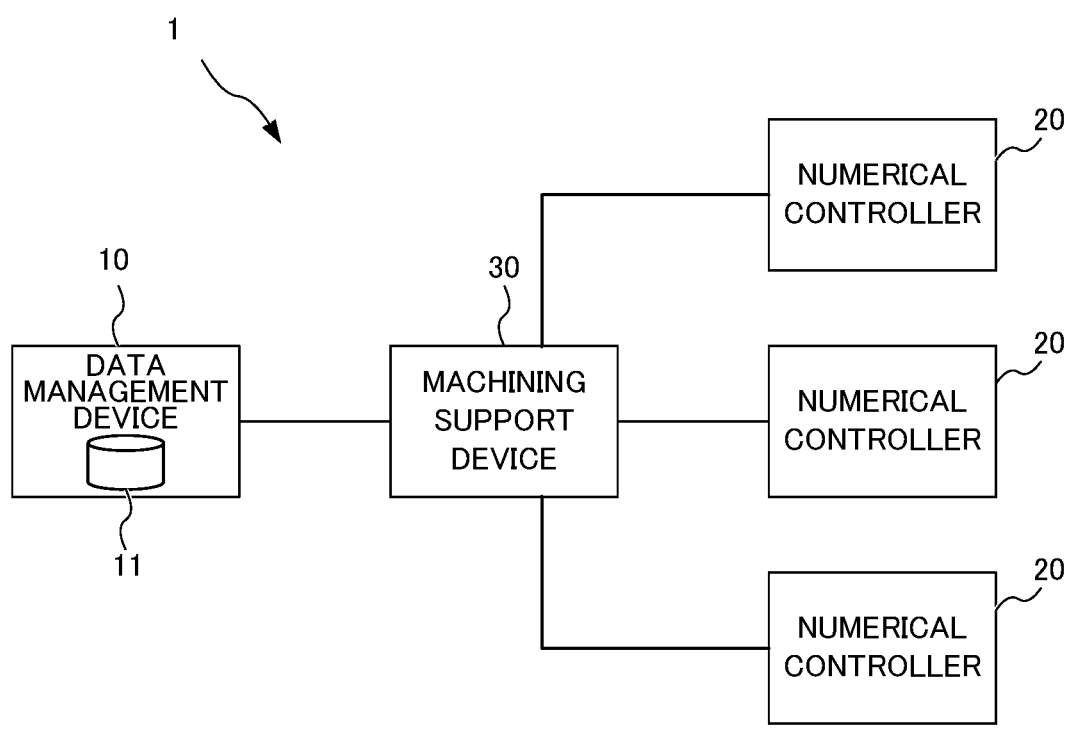
FIG. 1 is a schematic block diagram illustrating a machining support system according to a first embodiment of the present disclosure.

Next, the machining support device 30 and the machining support system 1 according to a first embodiment of the present disclosure will be described with reference to FIGS. 1 to 4. The machining support system 1 according to the present embodiment is a system that supports improvement in machining results of the numerical controller 20. For example, as illustrated in FIG. 1, the machining support system 1 includes the data management device 10, the numerical controller 20, and the machining support device 30.

The data management device 10 is an apparatus that can provide various pieces of data to the machining support device 30. The data management device 10 includes a database 11 that stores various pieces of information. The database 11 stores a work machining program set in CAD/CAM, for example. Specifically, the database 11 stores machining resource information indicating functions set in advance in the numerical controller 20, machining content information indicating the machining content to be executed by the numerical controller 20, and condition information indicating machining conditions included in the machining content information.

Here, the machining resource information is information on software (including option functions of a machining apparatus) set in advance in the numerical controller 20, for example. The machining content information is information including a machining operation to be executed by the numerical controller 20. The condition information is information indicating conditions such as good surface quality (roughness), dimension accuracy, short machining time, and the like when causing the numerical controller 20 to execute a machining process.

The numerical controller 20 is an apparatus that controls a machine tool. Software for operating a machine tool (not illustrated) is set in the numerical controller 20. The numerical controller 20 operates a machine tool by executing predetermined software using predetermined parameters according to the machining content information.

Figure 2:
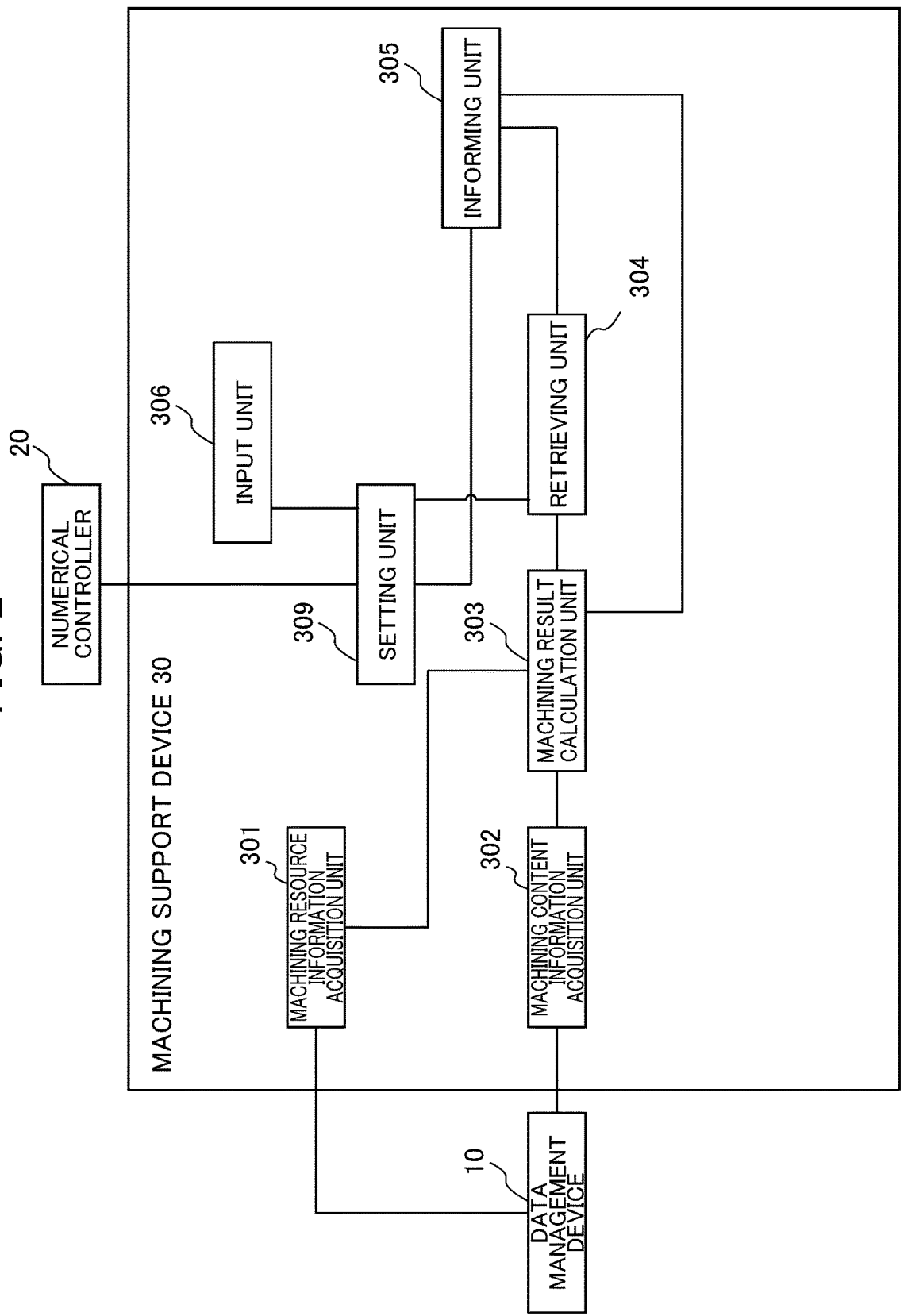
FIG. 2 is a block diagram illustrating a machining support device according to the first embodiment.

The machining support device 30 is an apparatus that supports improvement in the machining results of the numerical controller 20. As illustrated in FIG. 2, the machining support device 30 includes a machining resource information acquisition unit 301, a machining content information acquisition unit 302, a machining result calculation unit 303, a retrieving unit 304, an informing unit 305, an input unit 306, and a setting unit 309.

The machining resource information acquisition unit 301 is realized when a CPU operates, for example. The machining resource information acquisition unit 301 acquires machining resource information.

The machining content information acquisition unit 302 is realized when a CPU operates, for example. The machining content information acquisition unit 302 acquires machining content information.

The machining result calculation unit 303 is realized when a CPU operates, for example. The machining result calculation unit 303 calculates an expected machining result expected to be obtained when the machining content included in the machining content information is performed on the basis of the machining resource information. The machining result calculation unit 303 calculates results machined using the set parameters when the machining content is executed with the machining resources of the numerical controller 20, for example.

The retrieving unit 304 is realized when a CPU operates, for example. The retrieving unit 304 retrieves software that improves the calculated expected machining result. The retrieving unit 304 retrieves software (an option function) that enables good surface quality, high dimension accuracy, and a short machining time to be realized when the machining content is performed, for example. The retrieving unit 304 retrieves software of the same type of machining content stored in the database 11 as that of the expected machining result calculated by the machining result calculation unit 303, for example. The retrieving unit 304 refers to predetermined representative data (expectation data of quality obtained when predetermined parameters are set in the software) for each piece of software, stored in the database 11, for example. The retrieving unit 304 retrieves software showing better representative data than the expected machining result.

The informing unit 305 is realized when a CPU operates, for example. The informing unit 305 includes a display device such as a display, for example. The informing unit 305 informs of retrieved software. The informing unit 305 informs of the retrieved software by displaying the details thereof, for example. Moreover, the informing unit 305 informs of the content (display) indicating that the input of the machining resource information and the machining content information are to be received.

The input unit 306 is an input device such as a keyboard or a mouse, for example. The input unit 306 receives the input indicating whether the software informed of by the informing unit 305 can be set in the numerical controller 20. Moreover, the input unit 306 receives the input of machining parameters to be set in the numerical controller 20. Moreover, the input unit 306 receives the input of the addresses of the acquired machining resource information and machining content information, for example.

The setting unit 309 is realized when a CPU operates, for example. The setting unit 309 sets the retrieved software in the numerical controller 20 and determines machining parameters of the numerical controller 20 on the basis of the machining content included in the machining content information. The setting unit 309 sets the retrieved software in the numerical controller 20 when an input indicating execution of the setting is received by the input unit 306, for example. Moreover, the setting unit 309 sets machining parameters which enable the machining content to be performed in the numerical controller 20.

Figure 3:
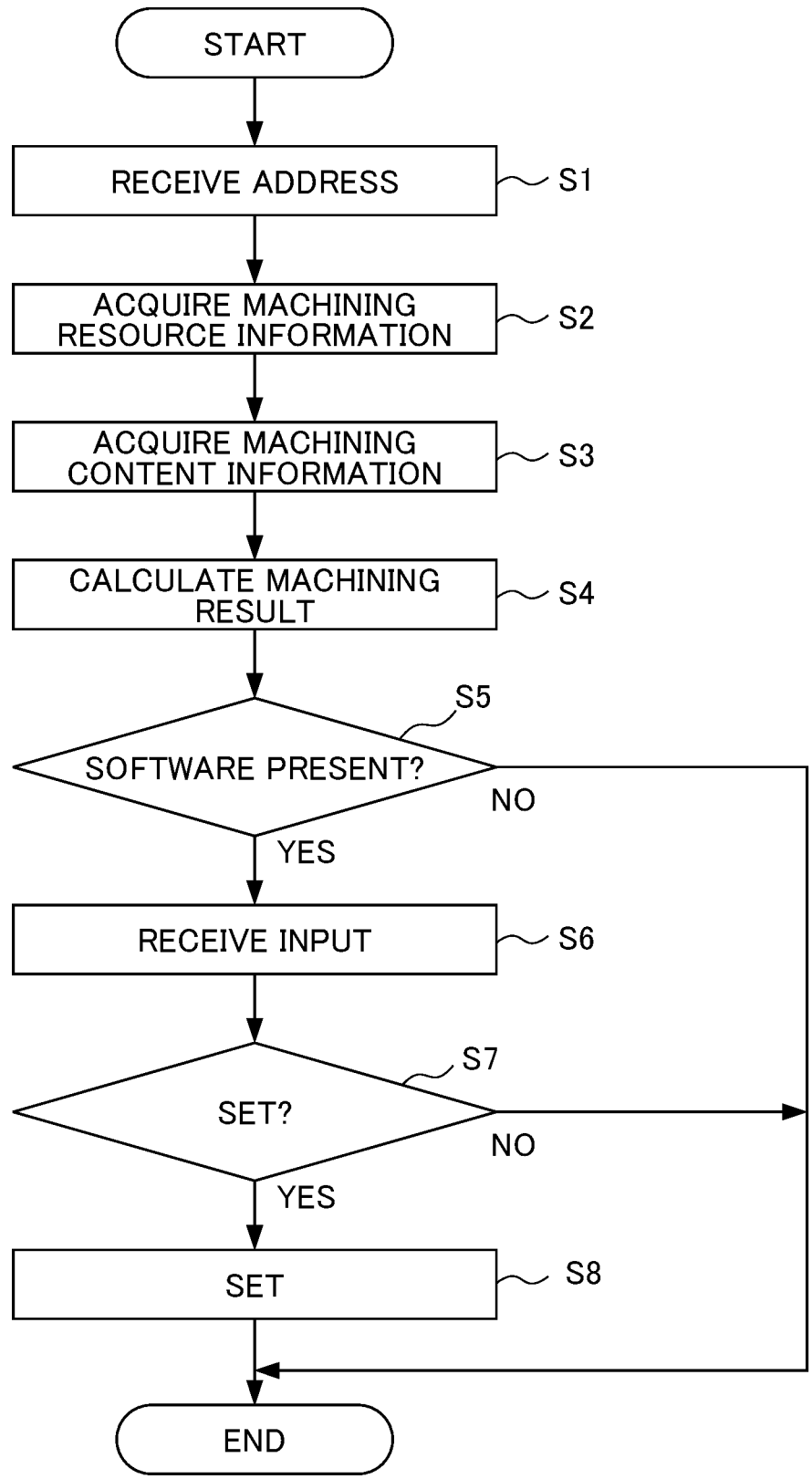
FIG. 3 is a flowchart illustrating an operation of the machining support device according to the first embodiment.
Figure 4:
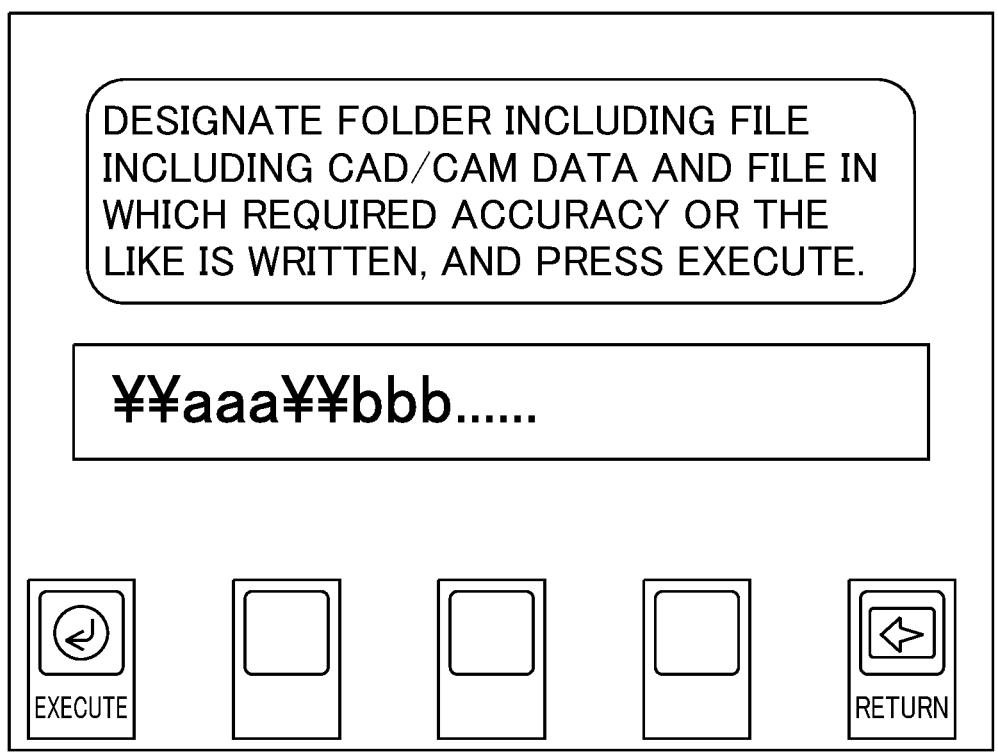
FIG. 4 is a screen view illustrating a screen displayed with the operation of the machining support device according to the first embodiment.

Next, an operation of the machining support device 30 will be described with reference to the flowchart of FIG. 3. First, as illustrated in FIG. 4, the informing unit 305 informs (displays) of an input screen for inputting the addresses of the positions of the machining resource information and the machining content information. The input unit 306 receives the input of the addresses from the user (step S1). Subsequently, the machining resource information acquisition unit 301 acquires the machining resource information on the basis of the input address (step S2). Subsequently, the machining content information acquisition unit 302 acquires the machining content information on the basis of the input address (step S3).

Figure 5:
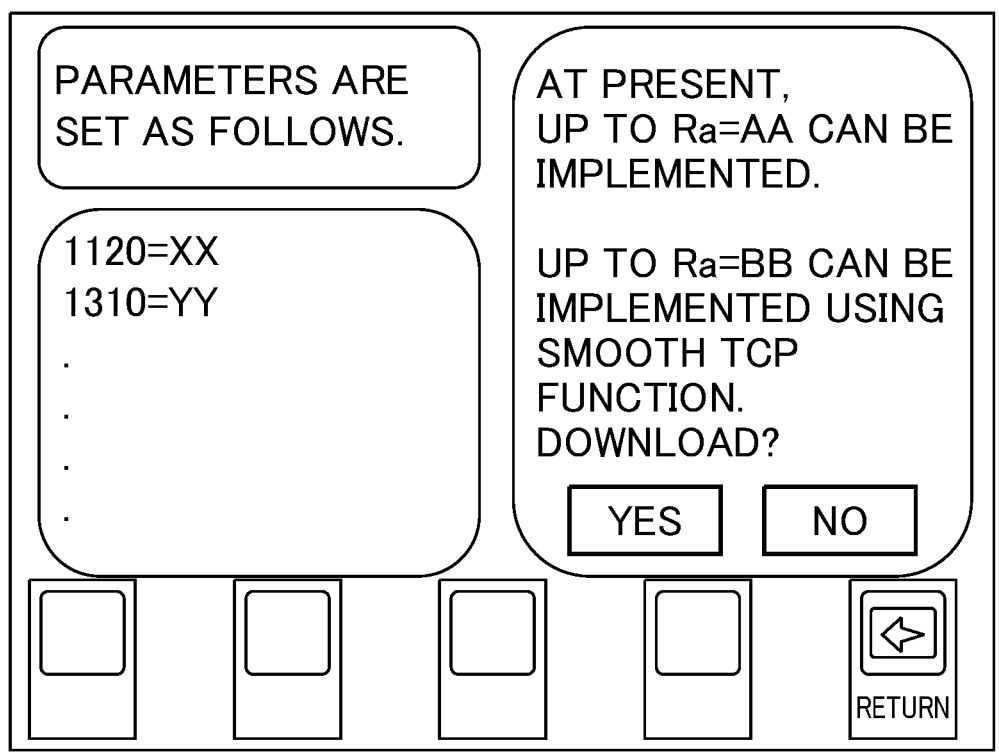
FIG. 5 is a screen view illustrating a screen displayed with the operation of the machining support device according to the first embodiment.

Subsequently, the machining result calculation unit 303 calculates an expected machining result (step S4). The retrieving unit 304 retrieves software that improves the expected machining result (step S5). The retrieving unit 304 retrieves an external database (not illustrated) to retrieve software, for example. When the improving software is present (step S5: YES), the informing unit 305 informs of the presence of the software (step S6). For example, as illustrated in FIG. 5, the informing unit 305 informs of the details of the parameters set by the machining result calculation unit 303, the expected machining result, and the improving software. On the other hand, when the improving software is not present (step S5: NO), this flow ends.

Figure 6:
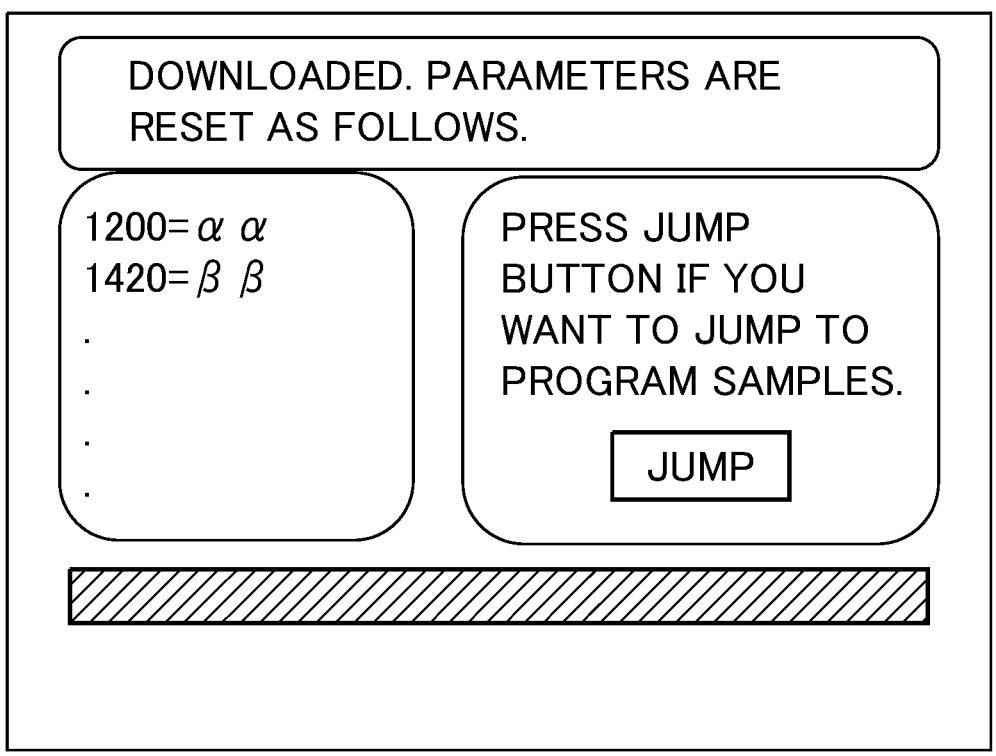
FIG. 6 is a screen view illustrating a screen displayed with the operation of the machining support device according to the first embodiment.

Subsequently, the input unit 306 receives the input regarding whether or not to set an improved program (step S6). When the program is to be set (step S7: YES), the setting unit 309 sets the improved program in the numerical controller 20 (step S8). In this case, the setting unit 309 sets machining parameters according to the machining content information. For example, as illustrated in FIG. 6, the informing unit 305 informs of the fact that the improved software is set, the machining parameters, and the use method of the set software. The informing unit 305 informs of program samples (for example, M codes and G codes) as the use method of software, for example. In this way, this flow ends. On the other hand, when the program is not set (step S7: NO), this flow ends.

According to the machining support device 30 according to the present embodiment described above, the following advantages are obtained.

(1) A machining support device 30 for supporting improvement of a machining result of a numerical controller 20, includes: a machining resource information acquisition unit 301 that acquires functions set in advance in the numerical controller 20 as machining resource information; a machining content information acquisition unit 302 that acquires a machining content to be executed by the numerical controller 20 as machining content information; a machining result calculation unit 303 that calculates an expected machining result expected to be obtained when the machining content included in the machining content information is performed on the basis of the machining resource information; a retrieving unit 304 that retrieves software that improves the calculated expected machining result; and an informing unit 305 that informs of the retrieved software. In this way, a user can check the presence of software that improves machining. Moreover, the user can select whether the improving software will be set. In this way, the setting of the numerical controller 20 can be performed in a more user-friendly manner.

(2) The machining support device 30 further includes: a setting unit 309 that sets the retrieved software in the numerical controller 20 and determines a machining parameter of the numerical controller 20 on the basis of the machining content included in the machining content information. In this way, since the machining parameters can be set automatically, it is possible to provide a system that is more user-friendly.

(3) The informing unit 305 informs of a use method of the set software. In this way, it is possible to understand a use method of new software easily.

Second Embodiment

Figure 7:
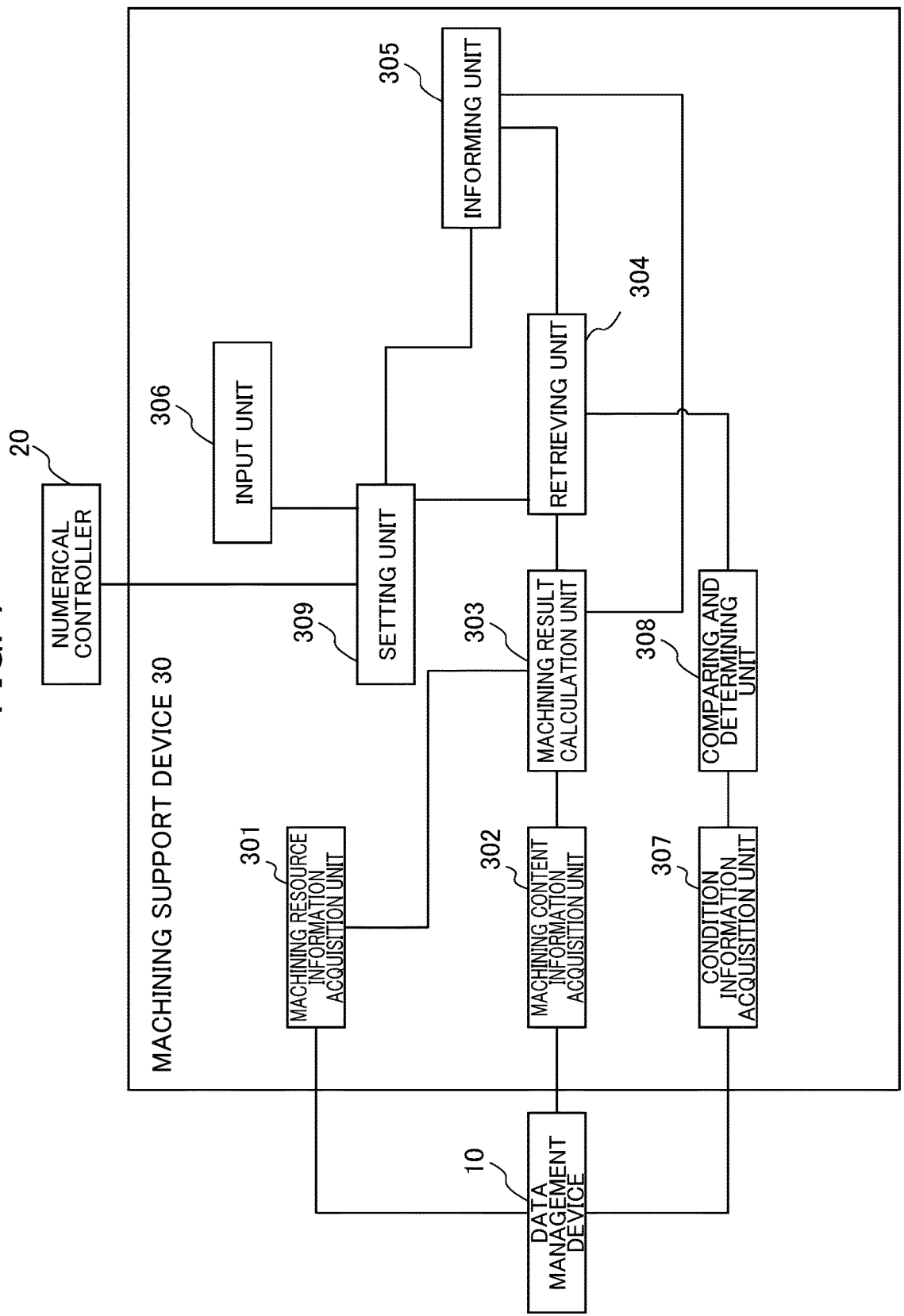
FIG. 7 is a block diagram illustrating a machining support device according to a second embodiment of the present disclosure.

Next, the machining support device 30 and the machining support system 1 according to a second embodiment of the present disclosure will be described with reference to FIG. 7. In description of the second embodiment, the same components as those of the above-described embodiment will be denoted by the same reference numerals and the description thereof will be omitted or simplified. The machining support system 1 according to the second embodiment is different from that of the first embodiment in that the machining conditions included in the machining content information are stored in the data management device 10 as condition information. The machining support device 30 according to the second embodiment is different from that of the first embodiment in that it further includes the condition information acquisition unit 307 and the comparing and determining unit 308. Moreover, the machining support device 30 according to the second embodiment is different from that of the first embodiment in that the retrieving unit 304 retrieves software when improvement in the machining conditions rather than the expected machining result is required.

The condition information acquisition unit 307 is realized when a CPU operates, for example. The condition information acquisition unit 307 acquires condition information. In the present embodiment, the condition information acquisition unit 307 acquires the condition information from the data management device 10.

The comparing and determining unit 308 is realized when a CPU operates, for example. The comparing and determining unit 308 compares the expected machining result with the conditions of the machining content included in the condition information. The comparing and determining unit 308 transmits the comparison result to the retrieving unit 304.

According to the machining support device 30 according to the present embodiment described above, the following advantages are obtained.

(4) The machining support device 30 further includes: a condition information acquisition unit 307 that acquires the machining condition included in the machining content information as condition information; and a comparing and determining unit 308 that compares the expected machining result with the condition of the machining content included in the condition information and determines whether the expected machining result satisfies the machining condition, and the retrieving unit 304 retrieves software when the comparing and determining unit 308 determines that the expected machining result does not satisfy the machining condition. In this way, since software can be retrieved according to machining conditions, it is possible to provide an apparatus that is more user-friendly.

Third Embodiment

Next, the machining support device 30 and the machining support system 1 according to a third embodiment of the present disclosure will be described. In description of the third embodiment, the same components as those of the above-described embodiments will be denoted by the same reference numerals, and the description thereof will be omitted or simplified. The machining support device 30 and the machining support system 1 according to the third embodiment are different from those of the second embodiment in that the machining result calculation unit 303 determines whether the machining content included in the machining content information can be performed on the basis of the machining resource information. The machining support device 30 and the machining support system 1 according to the third embodiment are different from those of the second embodiment in that the informing unit 305 informs of the fact that machining cannot be performed when it is determined that machining content cannot be performed.

According to the machining support device 30 act the present embodiment described above, the following advantages are obtained.

(5) The machining result calculation unit 303 determines whether the machining content included in the machining content information can be performed on the basis of the machining resource information, and when it is determined that the machining content cannot be performed, the informing unit 305 informs of the fact that machining cannot be performed. In this way, since it is possible to inform the user of the necessity to set software, it is possible to provide an apparatus that is more user-friendly.

Fourth Embodiment

Figure 8:
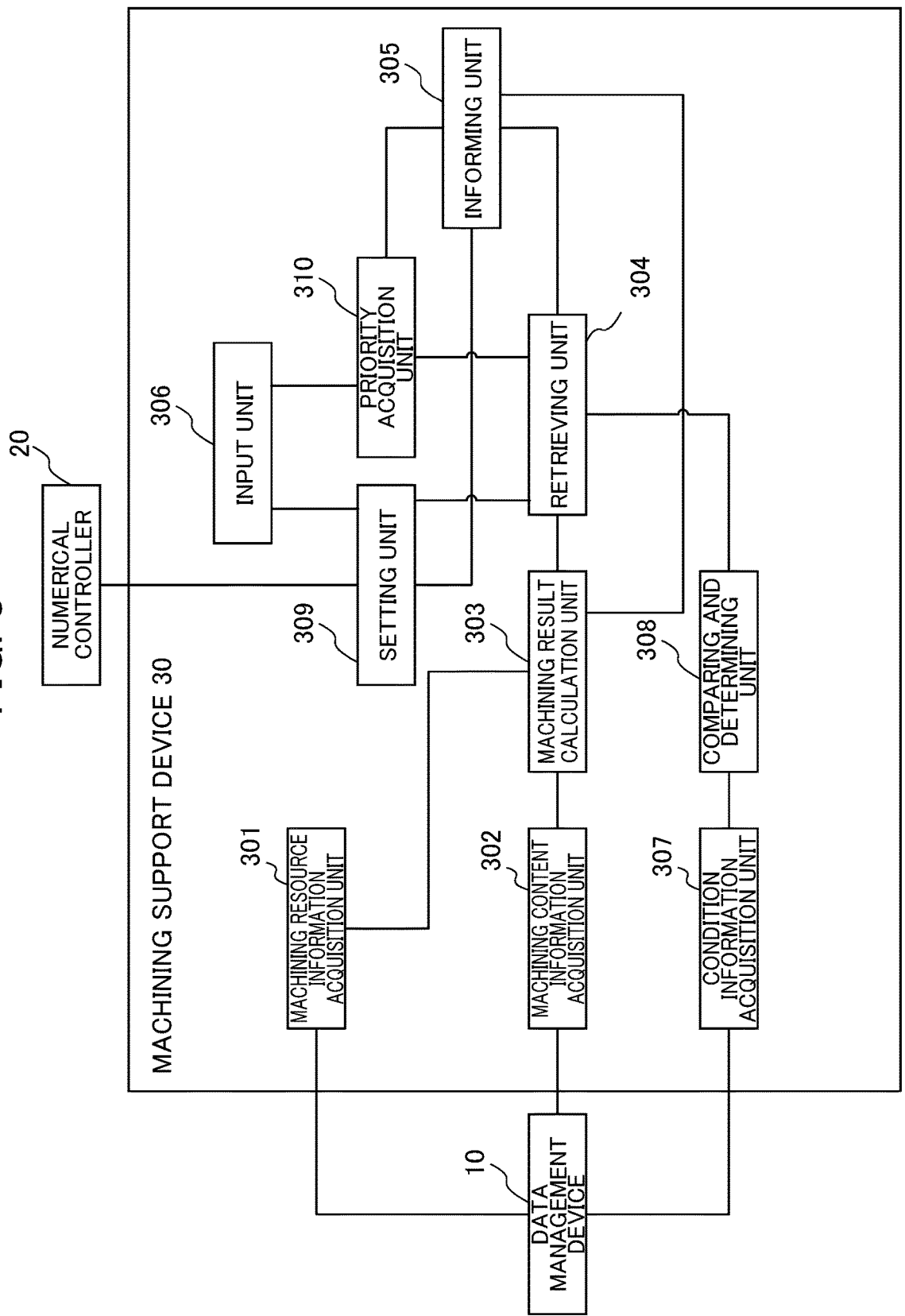
FIG. 8 is a block diagram illustrating a machining support device according to a fourth embodiment of the present disclosure.

Next, the machining support device 30 and the machining support system 1 according to a fourth embodiment of the present disclosure will be described with reference to FIG. 8. In description of the fourth embodiment, the same components as those of the embodiments described above will be denoted by the same reference numerals, and the description thereof will be omitted or simplified. The machining support device 30 according to the fourth embodiment is different from that of the first to third embodiments in that it further includes the priority acquisition unit 310. The machining support device 30 according to the fourth embodiment is different from that of the first to third embodiments in that the retrieving unit 304 retrieves software on the basis of an acquired priority.

Figure 9:
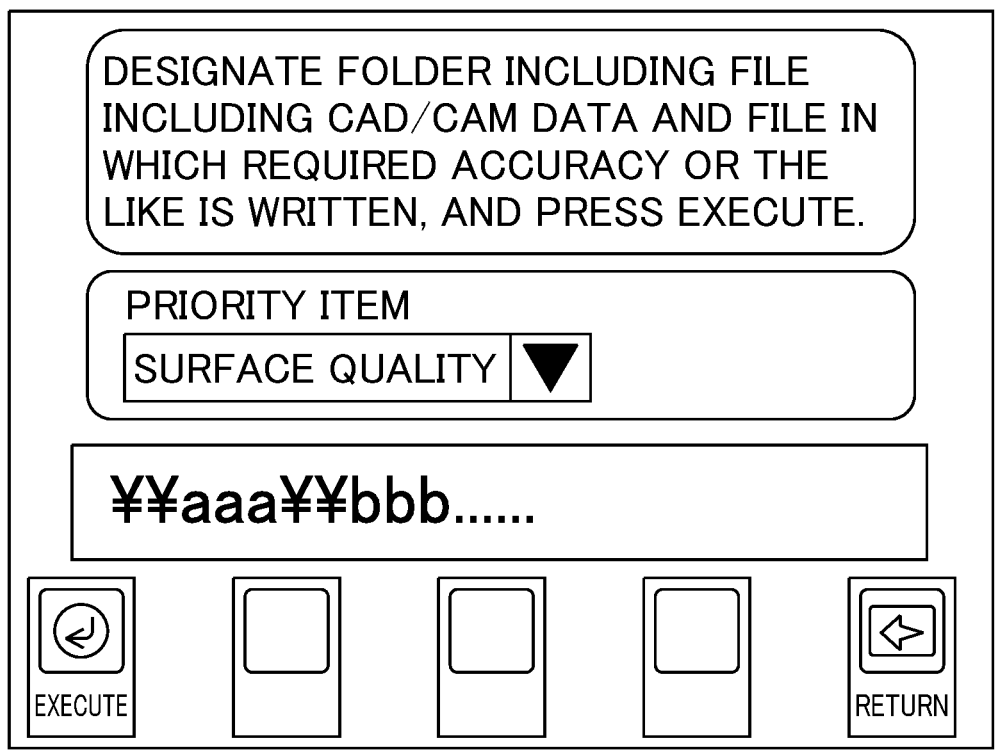
FIG. 9 is a screen view illustrating a screen displayed with the operation of the machining support device according to the fourth embodiment.
Figure 10:
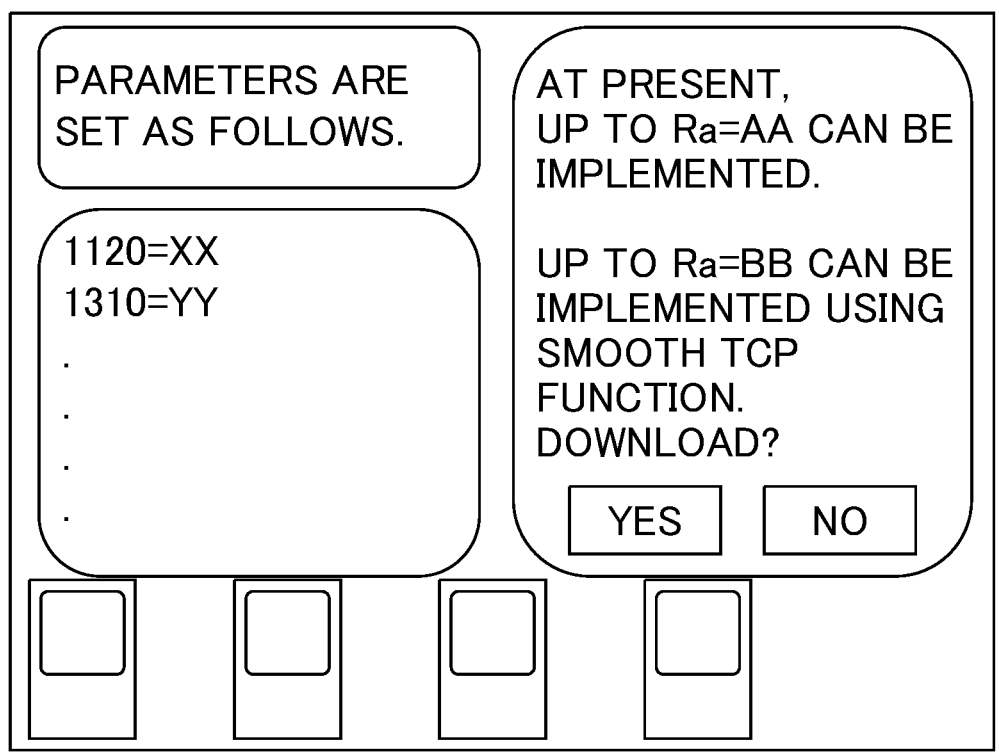
FIG. 10 is a screen view illustrating a screen displayed with the operation of the machining support device according to the fourth embodiment.

The priority acquisition unit 310 is realized when a CPU operates, for example. The priority acquisition unit 310 acquires a priority of the machining content. For example, the priority acquisition unit 310 acquires a priority by the input, which is an input regarding the screen informed by the informing unit 305 as illustrated in FIGS. 9 and 10, of a priority (indicated by "priority item" in FIG. 9) via the input unit 306. In the present embodiment, as illustrated in FIG. 9, for example, the priority acquisition unit 310 acquires improvement in "surface quality" among the pieces of information (surface quality, dimension accuracy, processing time, and the like) included in the condition information as a highest priority item. That is, the priority acquisition unit 310 causes the retrieving unit 304 to retrieve software that improves surface quality more than the expected machining result. When software is retrieved under another condition, the priority acquisition unit 310 causes the retrieving unit 304 to retrieve software according to condition information changed in a pull-down format, for example. As illustrated in FIG. 10, the retrieving unit 304 causes the informing unit 305 to inform of information related to software found as the retrieval result.

According to the machining support device 30 according to the present embodiment described above, the following advantages are obtained.

(6) The machining support device 30 further includes a priority acquisition unit 310 that acquires a priority of the machining content, and the retrieving unit 304 retrieves the software on the basis of the acquired priority. In this way, it is possible to designate a prioritizing machining content among a plurality of machining contents. Since improving software can be retrieved for a designated machining content, it is possible to provide an apparatus which is more flexible.

Fifth Embodiment

Next, the numerical controller 20 according to a fifth embodiment of the present disclosure will be described. In description of the fifth embodiment, the same components as those of the above-described embodiments will be denoted by the same reference numerals, and the description thereof will be omitted or simplified. A numerical controller (not illustrated) according to the fifth embodiment is different from that of the first to fourth embodiments in that it includes the machining support device 30. The numerical controller 20 according to the fifth embodiment is different from that of the first to fourth embodiments in that it is connected to a plurality of machine tools and can set the same software in a plurality of machine tools.

Sixth Embodiment

Figure 11:
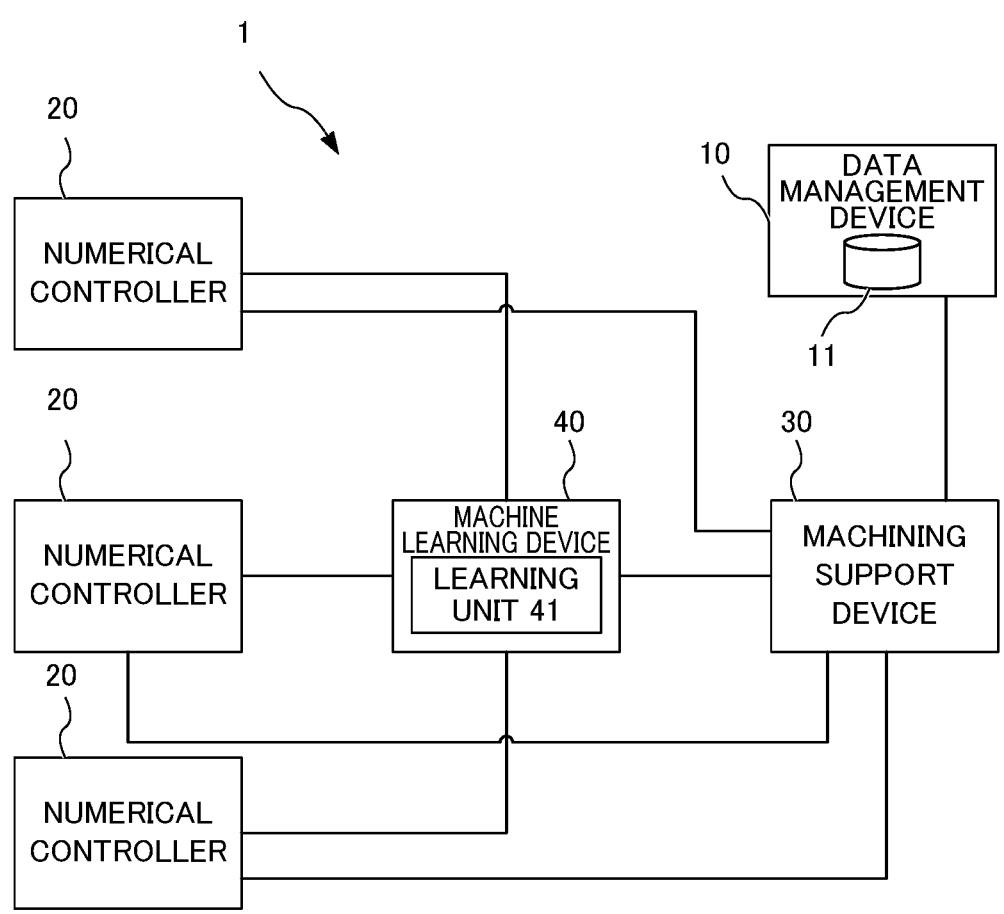
FIG. 11 is a schematic block diagram illustrating a machining support system according to a sixth embodiment of the present disclosure.

Next, the machining support system 1 according to a sixth embodiment of the present disclosure will be described with reference to FIG. 11. In description of the sixth embodiment, the same components as those of the above-described embodiments will be denoted by the same reference numerals, and the description thereof will be omitted or simplified. The machining support system 1 according to the sixth embodiment is different from that of the first to fifth embodiments in that it further includes a machine learning device 40.

The machine learning device 40 performs machine learning using the condition information, the software, and the parameters set in the numerical controller 20 by the machining support device 30. The machine learning device 40 includes a learning unit 41 that learns an optimal combination from the set condition information, software, and parameters. For example, the learning unit 41 is set so as to be able to output software and parameters preferable for the condition information set in another numerical controller 20.

According to the machining support system 1 according to the present embodiment described above, the following advantages are obtained.

(7) A machining support system 1 includes: a plurality of numerical controllers 20; the machining support device 30 according to (4); and a machine learning device 40 that performs machine learning using the condition information, the software, and the parameter set in the numerical controller 20 by the machining support device 30, and the machine learning device 40 includes a learning unit 41 that learns an optimal combination from the set condition information, software, and parameter. In this way, it is possible to output software and parameters that can better satisfy the machining conditions set in the condition information. Therefore, it is possible to provide a system that is more user-friendly.

While preferred embodiments of the machining support device, the numerical controller, and the machining support system according to the present disclosure have been described, the present disclosure is not limited to the above-described embodiments but can be changed appropriately.

For example, in the above-described embodiments, the machining support system 1 may include a plurality of numerical controllers 20. In this way, the machining support device 30 can support the plurality of numerical controllers 20.

In the above-described embodiments, although the machining result calculation unit 303 calculates the expected machining result according to the machining resources and the machining contents, there is no limitation thereto. The data management device 10 may store representative data of the results machined with the machining resources and the machining contents in advance. The machining result calculation unit 303 may acquire the representative data from the data management device 10.

Figure 12:
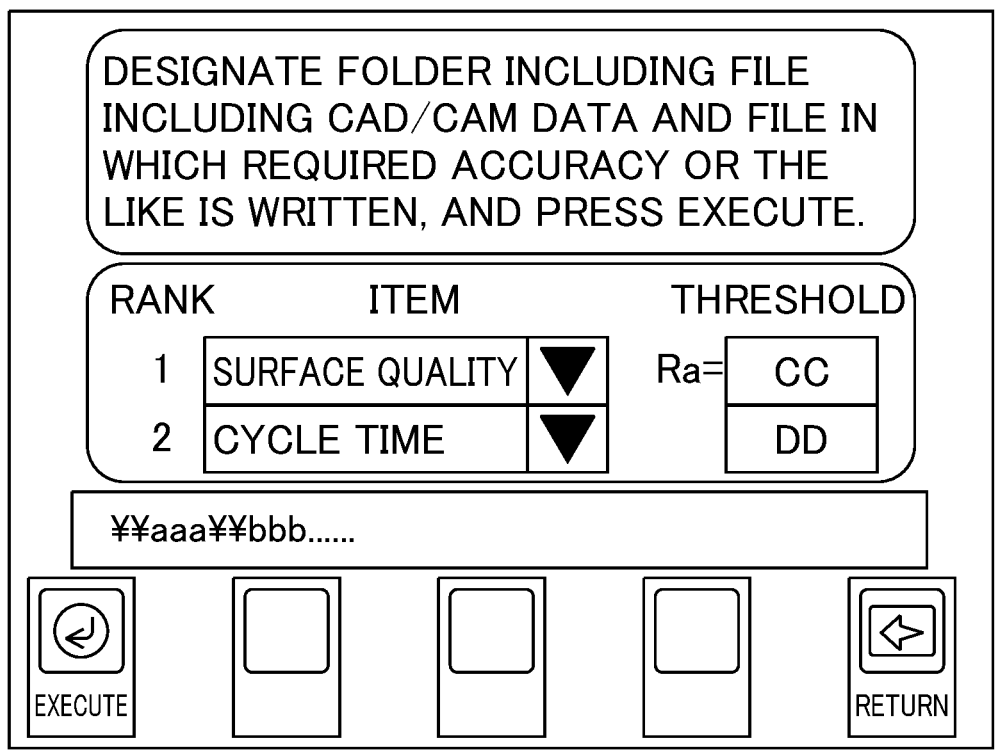
FIG. 12 is a screen view illustrating a screen displayed with the operation of a modification of the machining support device according to the present disclosure.

In the fourth embodiment, the priority acquisition unit 310 may acquire a plurality of priorities as illustrated in FIG. 12. For example, the priority acquisition unit 310 may acquire a threshold for each of a plurality of priorities (indicated by "ranks" in FIG. 12). The retrieving unit 304 may retrieve software that improves better than the thresholds for the plurality of priorities. Specifically, as illustrated in FIG. 12, the priority acquisition unit 310 may cause the retrieving unit 306 to retrieve software that satisfies (or improves better than the threshold) the thresholds of priority items using "surface quality" as the highest priority item and "cycle time" as the next highest priority item. Moreover, the priority acquisition unit 310 may cause the retrieving unit 304 to retrieve software having the highest degree of satisfying the thresholds of the lower priority items (which satisfies the largest number of thresholds of the lower priority items) while satisfying the threshold of the highest priority item.

EXPLANATION OF REFERENCE NUMERALS

1: Machining support system
20: Numerical controller
30: Machining support device
40: Machine learning device
41: Learning unit
301: Machining resource information acquisition unit
302: Machining content information acquisition unit
303: Machining result calculation unit
304: Retrieving unit
305: Informing unit
307: Condition information acquisition unit
308: Comparing and determining unit
309: Setting unit
310: Priority acquisition unit

What is claimed is:

1. A machining support device for supporting improvement of a machining result of a numerical controller, comprising:
a machining resource information acquisition unit that acquires functions set in advance in the numerical controller as machining resource information;
a machining content information acquisition unit that acquires a machining content to be executed by the numerical controller as machining content information;
a machining result calculation unit that calculates an expected machining result expected to be obtained when the machining content included in the machining content information is performed on the basis of the machining resource information;
a retrieving unit that retrieves software that improves the calculated expected machining result;
an informing unit that informs of the retrieved software; and
a priority acquisition unit that acquires a priority of the machining content, wherein
the retrieving unit retrieves the software on the basis of the acquired priority.

2. The machining support device according to claim 1, further comprising:
a setting unit that sets the retrieved software in the numerical controller and determines a machining parameter of the numerical controller on the basis of the machining content included in the machining content information.

3. The machining support device according to claim 2, wherein
the informing unit informs of a use method of the set software.

4. The machining support device according to claim 1, further comprising:
a condition information acquisition unit that acquires a machining condition included in the machining content information as condition information; and
a comparing and determining unit that compares the expected machining result with the machining condition included in the condition information and determines whether the expected machining result satisfies the machining condition, wherein
the retrieving unit retrieves software when the comparing and determining unit determines that the expected machining result does not satisfy the machining condition.

5. The machining support device according to claim 1, wherein
the machining result calculation unit determines whether the machining content included in the machining content information can be performed on the basis of the machining resource information, and
when it is determined that the machining content cannot be performed, the informing unit informs of the fact that machining cannot be performed.

6. A numerical controller comprising the machining support device according to claim 1.

7. A machining support system comprising:
a plurality of numerical controllers; and
the machining support device according to claim 1, wherein
the machining support device informs the other numerical controllers of the software retrieved by one of the numerical controllers.

8. A machining support system comprising:
a plurality of numerical controllers;
the machining support device according to claim 4; and
a machine learning device that performs machine learning using condition information, software, and a parameter set in the numerical controller by the machining support device, wherein
the machine learning device includes a learning unit that learns an optimal combination from the set condition information, software, and parameter.

* * * * *